United States Patent [19]
Sakamoto et al.

[11] Patent Number: 5,670,764
[45] Date of Patent: Sep. 23, 1997

[54] IMPACT SENSOR

[75] Inventors: Kazunori Sakamoto, Chiryu; Masanobu Ishikawa; Atsushi Onoda, both of Nagoya; Koji Ito, Kariya, all of Japan

[73] Assignee: Aisin Seiki Kabushiki Kaisha, Kariya, Japan

[21] Appl. No.: 360,116

[22] Filed: Dec. 20, 1994

Related U.S. Application Data

[63] Continuation of Ser. No. 942,009, Sep. 8, 1992, abandoned.

[30] Foreign Application Priority Data

Sep. 9, 1991 [JP] Japan ................. 3-229097
Aug. 26, 1992 [JP] Japan ................. 4-226570

[51] Int. Cl.$^6$ ............................................. H01H 35/14
[52] U.S. Cl. ............................................. 200/61.45 R
[58] Field of Search ........................ 74/2; 280/734; 200/61.45 R–61.45 M

[56] References Cited

U.S. PATENT DOCUMENTS

| | | | |
|---|---|---|---|
| 2,547,199 | 4/1951 | Dezzani | 200/61.45 R |
| 3,449,632 | 6/1969 | Hagel | 317/9 |
| 3,647,999 | 3/1972 | Mazelsky | 200/61.45 R |
| 3,889,130 | 6/1975 | Breed | 307/121 |
| 4,321,438 | 3/1982 | Emenegger | 200/61.45 R |
| 4,927,172 | 5/1990 | Motozawa | 280/734 |
| 5,024,157 | 6/1991 | Nishikawa | 102/252 |
| 5,059,751 | 10/1991 | Woodman et al. | 200/61.45 M |
| 5,142,922 | 9/1992 | Sakamoto et al. | 74/2 |
| 5,143,403 | 9/1992 | Föhl | 280/806 |
| 5,193,407 | 3/1993 | Sakamoto et al. | 74/2 |
| 5,217,252 | 6/1993 | Kawaguchi et al. | 280/731 |
| 5,233,141 | 8/1993 | Breed | 200/61.45 R |
| 5,285,031 | 2/1994 | Schueneman | 200/61.48 |
| 5,363,710 | 11/1994 | Sakamoto | 74/2 |

FOREIGN PATENT DOCUMENTS

| | | | |
|---|---|---|---|
| 2559584 | 8/1985 | France | B60R 21/32 |
| 52-18641 | 2/1977 | Japan | B60R 18/001 |
| 56-154348 | 11/1981 | Japan | B60R 21/00 |
| 57-7939 | 2/1982 | Japan | B60R 21/12 |
| 2-249744 | 10/1990 | Japan | B60R 21/32 |
| 2-400187 | 12/1990 | Japan | B60R 21/32 |
| 3-65942 | 3/1991 | Japan | B60R 21/32 |
| 3-121945 | 12/1991 | Japan | B60R 21/32 |

*Primary Examiner*—Michael L. Gellner
*Assistant Examiner*—Michael A. Friedhofer
*Attorney, Agent, or Firm*—Finnegan, Henderson, Farabow, Garrett and Dunner, L.L.P.

[57] ABSTRACT

A impact sensor includes a housing, a weight disposed within the housing for being moved by an externally applied impact that is in excess of a predetermined value, an output lever disposed within the housing for being disengaged by movement of the weight to move in one direction, a first contact point provided on the output lever, or the housing and a second contact point provided on the housing so as to lie on the path of movement of the output lever. The first and second contact points are electrically connected by coming into contact by movement of the output lever, thereby actuating an air-bag mechanism connected to the first and second contact points.

15 Claims, 12 Drawing Sheets

IMPACT SENSOR

This application is a continuation, of application Ser. No. 07/942,009 filed Sep. 8, 1992, now abandoned.

BACKGROUND OF THE INVENTION

1. Field of the Invention

This invention relates to an impact sensor utilized as a sensor for starting an impact safety system, such as an air bag.

2. Description of the Prior Art

A conventional impact sensor of this kind known in the art is as disclosed in the specification of Japanese Patent Application Laid-Open (KOKAI) No. 2-249744 (corresponding to U.S. Pat. No. 5,024,157). The sensor includes a housing, a weight disposed within the housing for being moved along elongated grooves on the opposed side walls of the housing by an externally applied impact that is in excess of a predetermined value, an output member disposed within the housing for being disengaged by movement of the weight to move in a projecting direction, a firing pin formed on the output member, and an igniting member disposed on the path of movement of the firing pin, which results from movement of the output member, to serve as a starting member for actuating an impact safety device impacted upon by the firing pin. When an impact greater than the predetermined value is applied, the weight is moved and the output member is disengaged from a cam member of the weight by movement of the weight, whereby the output member moves in the projecting direction. As a result, the firing pin strikes and drives the igniting member to actuate the impact safety mechanism.

In the impact sensor described above, the firing pin impacts directly against the iginiting member serving as the starting member which actuates the impact safety device, thereby actuating the impact safety device. Accordingly, the impact safety system and the impact sensor are required to be in close proximity to each other at all times, and one impact sensor is always required for one impact safety system. As a consequence, a major limitation is placed upon the impact sensor in terms of its layout with respect to the impact safety system.

SUMMARY OF THE INVENTION

Accordingly, an object of the present invention is to provide an impact sensor, the layout of which possesses a high degree of freedom.

According to the present invention, the foregoing object is attained by providing an impact sensor including a housing, a weight disposed within the housing and supported through a shaft on the housing for being moved by an externally applied impact that is in excess of a predetermined value, an output member disposed within the housing for being disengaged from the shaft by movement of the weight to move in one direction, a first contact point provided on the output member, and a second contact point for being contacted by the first contact point, the second contact point being provided on the housing so as to lie on a path of movement of the output member, wherein the first and second contact points are electrically connected by coming into contact by movement of the output member, thereby actuating an impact safety system connected to the first and second contact points.

According to another aspect of the present invention, the foregoing object is also attained by providing an impact sensor including a housing, a weight disposed within the housing for being moved by an externally applied impact that is in excess of a predetermined value, an output member disposed within the housing for being disengaged by movement of the weight to move in one direction, and a first contact point and a second contact point provided on the housing so as to lie on a path of movement of the output member, wherein the first and second contact points are electrically connected via the output member by coming into contact with the output member by movement of the output member, thereby actuating an impact safety system connected to the first and second contact points.

In one embodiment, the output member is moved toward the housing by being acted upon by the biasing force of a spring stretched between the housing and the output member. In addition, movement of the weight is rotational sliding motion produced by moving means disposed between the housing and the weight.

In another embodiment, movement of the weight is swinging motion about a fulcrum obtained by supporting the weight on a frame at a position offset from the center of gravity of the weight.

In accordance with the present invention, an impact safety system is actuated either by an electrical connection between the first contact point and the second contact point resulting from contact between these two contact points, or by an electrical connection between the first contact point and the second contact point via the output member resulting from contact between these two contact points and the output member. As a result, the impact sensor can be laid out freely with respect to the impact safety system, and it is possible to adopt an arrangement in which a plurality of the impact safety systems are actuated by a single impact sensor and to install the impact sensor and the impact safety system in spaced-apart relation. In particular, the fact that an impact safety system is actuated either by the electrical connection between the first contact point and the second contact point or by the electrical connection between the first contact point and the second contact point via the output member resulting from contact between these two contact points and the output member makes it possible to actuate, by a single impact sensor, two impact safety systems installed at remote locations, this being achieved by a simple arrangement which merely entails adding the first and second contact points to the conventional impact sensor.

Further, the output member is moved in the projecting direction by being subjected to the biasing force of the spring stretched between the housing and the output member. Therefore, once the first and second contact points have been electrically connected, the connection is maintained by the biasing force of the spring. As a consequence, the impact safety mechanism can be held in the actuated state irrespective of the subsequent position of the weight, i.e., regardless of input of a subsequent impact.

Furthermore, motion of the weight is either rotational sliding motion resulting from moving means, for example, a pinion and a rack gear, disposed between the housing and the weight, or swinging motion about a fulcrum obtained by supporting the weight on the frame of the housing at a position offset from the center of gravity of the weight. Consequently, the moment of inertia resulting from the shape of the weight can be exploited effectively in sensing impact, and erroneous operation can be prevented more reliably as by not sensing instantaneous shocks produced when the vehicle equipped with the impact sensor travels on a bad road.

Thus, according to the present invention, the impact safety system is capable of being remotely actuated, and therefore the impact sensor can be arranged relative to the impact safety system with a high degree of freedom.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS

Preferred embodiments of the present invention will now be described with reference to the accompanying drawings.

Figure 1A:
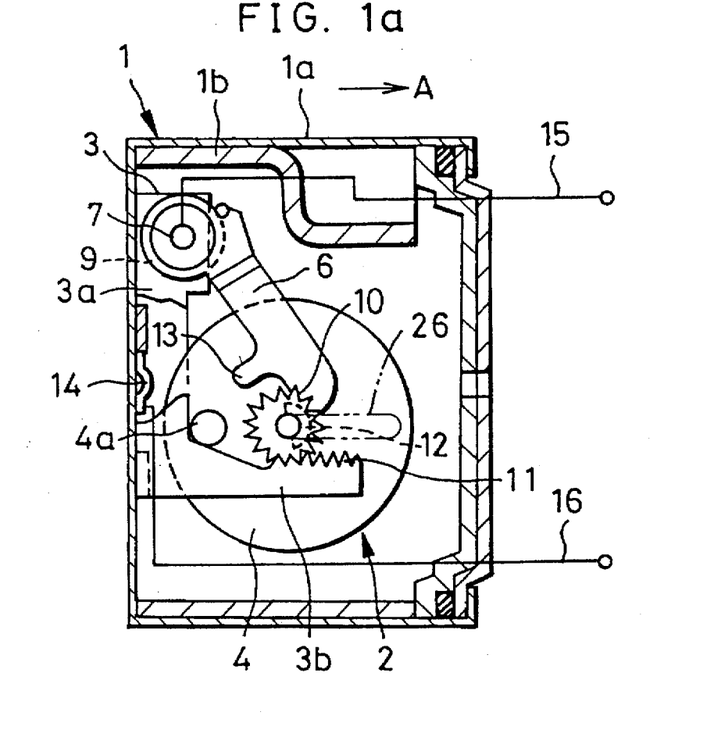
FIG. 1a is a section illustrating a first embodiment of an impact sensor according to the present invention.
Figure 1B:
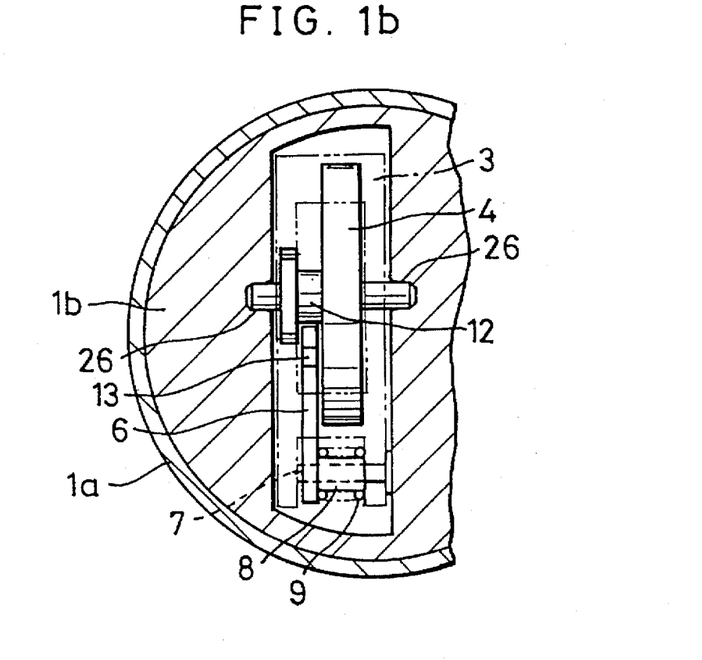
FIG. 1b a section showing a shaft supporting a weight.

As shown in FIGS. 1a and 1b, an impact sensor according to a first embodiment of the invention includes a housing 1 in the shape of a box constructed by a combination of a case 1a, an inside housing 1b and a frame 3. An impact sensing mechanism 2 is disposed in the interior space of the housing 1. The inside housing 1b is provided at opposed side walls with elongated slots 26.

Figure 2:
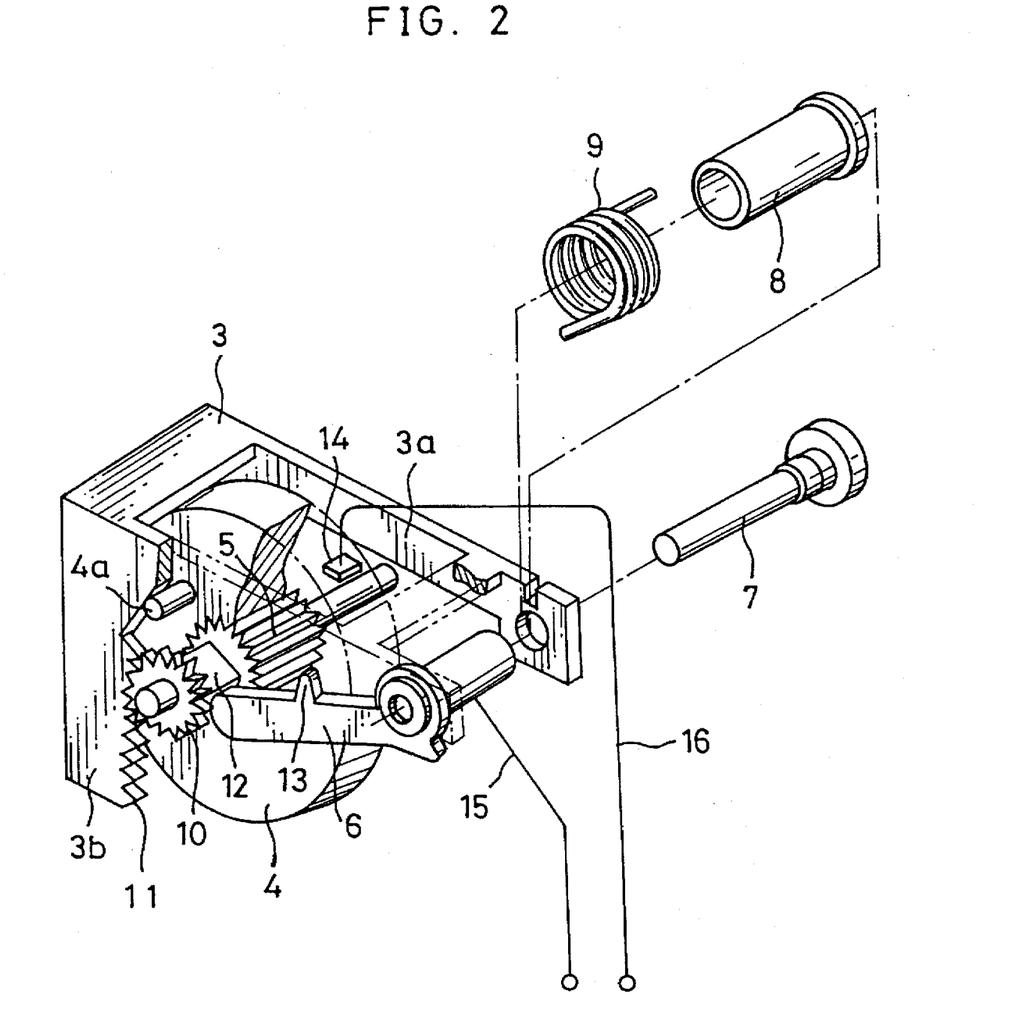
FIG. 2 is a perspective view illustrating an impact sensing mechanism according to the first embodiment.

As illustrated in FIGS. 1a, 1b, and 2, the frame 3 is composed of a pair of opposing support portions 3a and a flange portion 3b perpendicular to the support portions 3a. A disc shaped impact-sensing weight 4 moved by input of an impact, is freely movably supported within the slots 26 of the housing 4 via a shaft 5 that moves in unison with the weight. The weight 4 has a comparatively large diameter, and has the shaft 5 at its center. As a result, a large moment of inertia can be produced when the weight 4 moves and erroneous operation can be prevented more reliably as by not sensing instantaneous shocks produced when the vehicle equipped with the impact sensor travels on a bad road. The weight 4 is formed to have a stopper pin 4a which abuts against the flange 3b of the frame 3. The initial position of the weight 4 within the housing 1 is determined by the abutting contact between the flange portions 3b and the stopper pin 4a. An output lever 6 is pivotally supported between the support portions 3a of the frame 3 via a pin 7. A torsion spring 9 is wound around the pin 7. One end of the torsion spring 9 is fastened to one of the support portion 3a, and the other end of the torsion spring 9 is fastened to the output lever 6. The output lever 6 is thus biased at all times in the clockwise direction in FIG. 1a by the biasing force of the torsion spring 9. A pinion gear 10 is fixedly secured to the shaft 5, and the flange 3b of the frame 3 is formed to have a rack gear 11 which meshes with the pinion gear 10. Further, the shaft 5 is formed to have a semicircular cam portion 12 capable of engaging with and disengaging from the output lever 6. Since the output lever 6, pinion gear 10, rack gear 11 and weight 4 are thus supported on the frame 3, these can be made a unit separate from the housing 1 to greatly improve ease of installation. Furthermore, the members 4, 6, 10 and 11 do not readily experience installation error relative to one another, thereby assuring stable operation of the device as an impact sensor.

Figure 3:
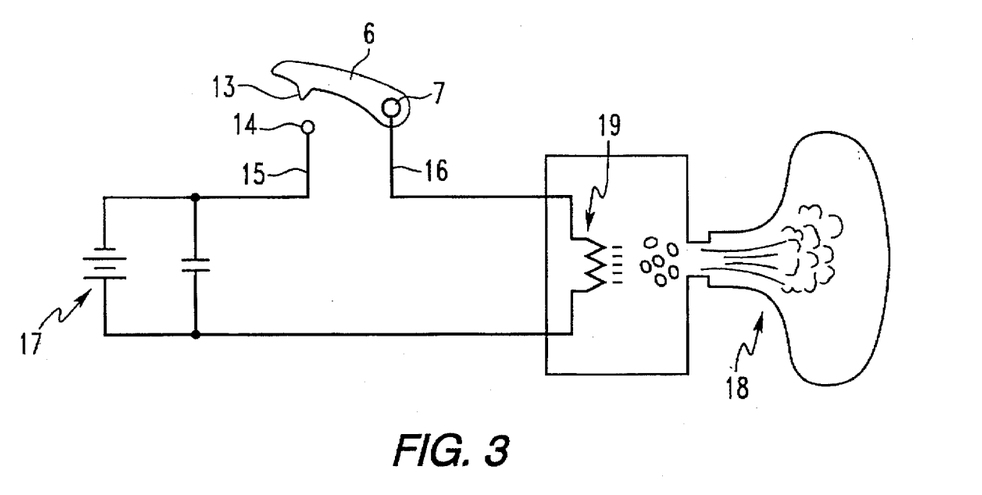
FIG. 3 is a circuit diagram showing an impact safety system employing the impact sensor of the first embodiment.

The output lever 6 is provided with a first contact point 13 integral therewith. A second contact point 14 capable of coming into contact with the first contact point 13 is provided on the plate-shaped member 1a so as to lie on the path of arcuate motion of the first contact point 13 moved owing to the turning motion of the output lever 6. As illustrated in FIG. 3, the first contact point 13 and the second contact point 14 are connected between a power supply 17 and an igniting device 19, which actuates an air-bag mechanism 18, via lead wires 15, 16. Thus, the contact points 13, 14 act as a switch for actuating the air-bag mechanism 18. The lead wire 15 connected to the first contact 13 is connected to the pin 7, and the output lever 6 and pin 7 consist of an electrically conductive material.

The operation of the first embodiment will now be described.

Figure 4:
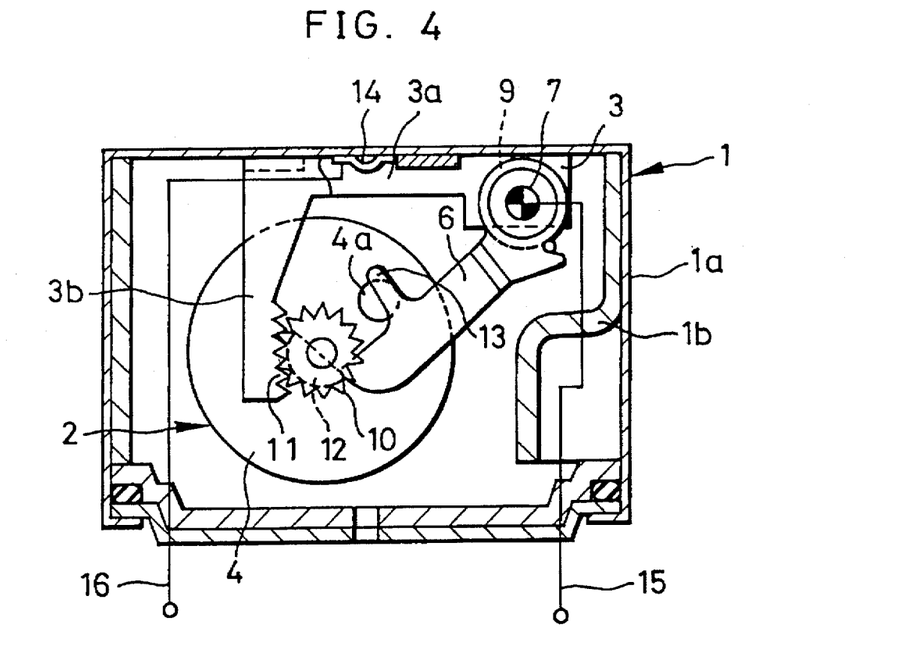
FIG. 4 is a section corresponding to FIG. 1 and illustrating the operation of the first embodiment.
Figure 5:
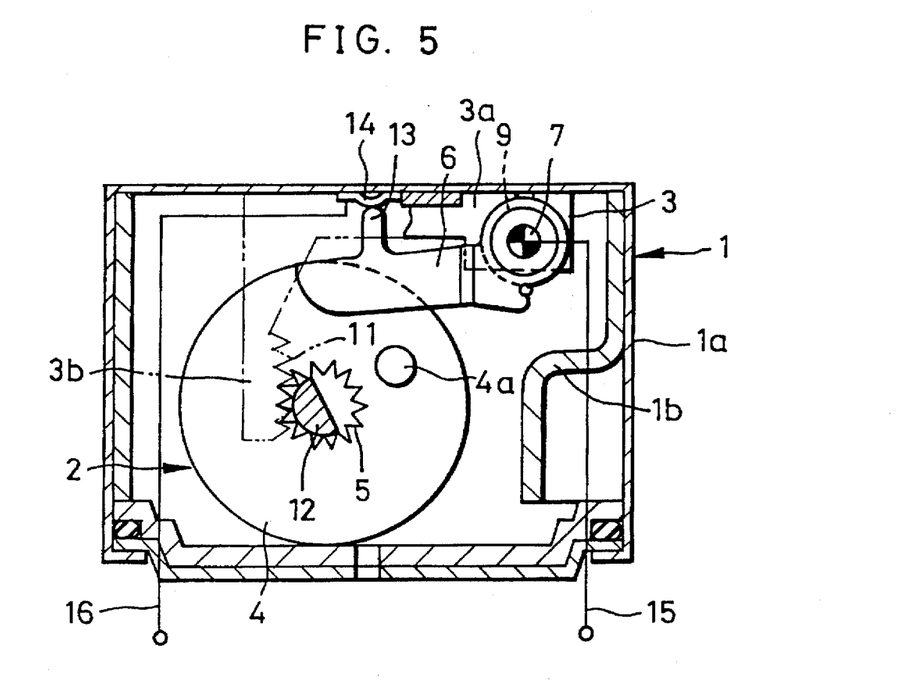
FIG. 5 is a view corresponding to FIG. 1 and illustrating the operation of the first embodiment.

FIG. 1a illustrates the apparatus in the initial state, in which the cam 12 and the output lever 6 are engaged. The weight 4 is maintained in an initial state, wherein the stopper pin 4a and the flange portion 3b are in abutting contact, owing to the biasing force of the torsion spring 9, and the output lever 6 is held against the biasing force of the torsion spring 9 owing to the engagement between the output lever 6 and the cam 12. When an impact is applied in the direction of arrow A under these conditions, the weight 4 rotates and slides (i.e., senses the impact) against the biasing force of the torsion spring 9 owing to the meshing engagement between the pinion gear 10 and the rack gear 11, as shown in FIG. 4, thereby disengaging the cam portion 12 and the output lever 6. Accordingly, the output lever 6 is acted upon by the biasing force of the torsion spring 9 and therefore is turned so that the first contact point 13 and second contact point 14 come into contact, as illustrated in FIG. 5. As a result, in FIG. 3 a conductive state (i.e., an electrically connected state) is established between the power supply 17 and the igniting device 19 which operates the air-bag mechanism 18, thereby driving the igniting device 19 so as to actuate the air-bag mechanism 18.

As set forth above, the contact between the first contact point 13 and the second contact point 14 resulting from actuation of the impact sensor 2 establishes an electrically conductive state between the power supply 17 and the igniting device 19, which actuates the air-bag mechanism 18, as a result of which the air-bag mechanism is actuated. This means that the layout of the impact mechanism 2 can be designed at will with respect to the air-bag mechanism 18 and the igniting device 19 (the impact safety mechanism), and it is possible to adopt an arrangement in which a plurality of the air-bag mechanisms 18 are actuated by a single impact sensor and to install the impact sensor 2 and the air-bag mechanism 18 in spaced-apart relation. Furthermore, after the first and second contact points 13, 14 come into contact, this contact is maintained by the torsion spring 9. As a consequence, once the air-bag mechanism 18 has been actuated, it is capable of remaining in the actuated state at all times irrespective of the subsequent position of the weight 4, i.e., regardless of input of a subsequent imapct.

A second embodiment will be described.

Figure 6:
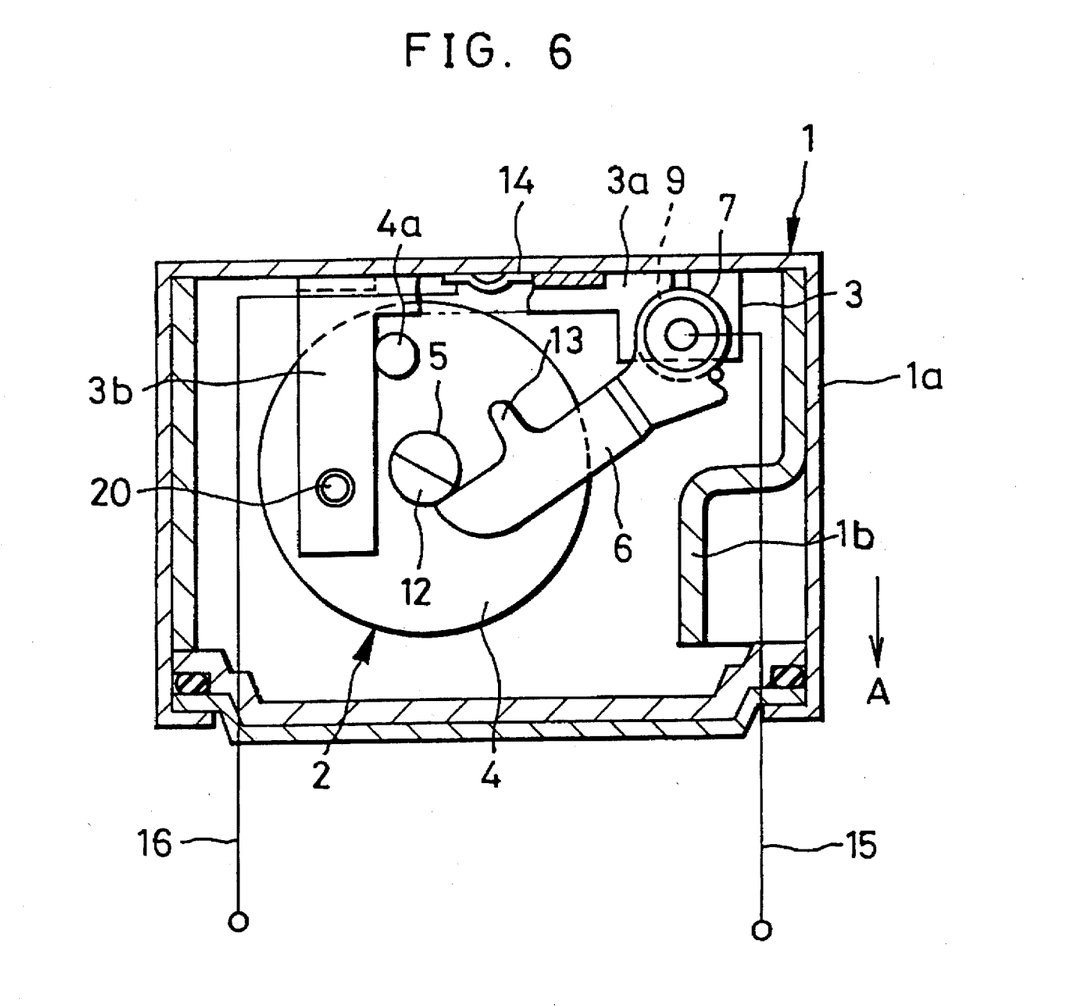
FIG. 6 is a section showing a second embodiment.
Figure 7:
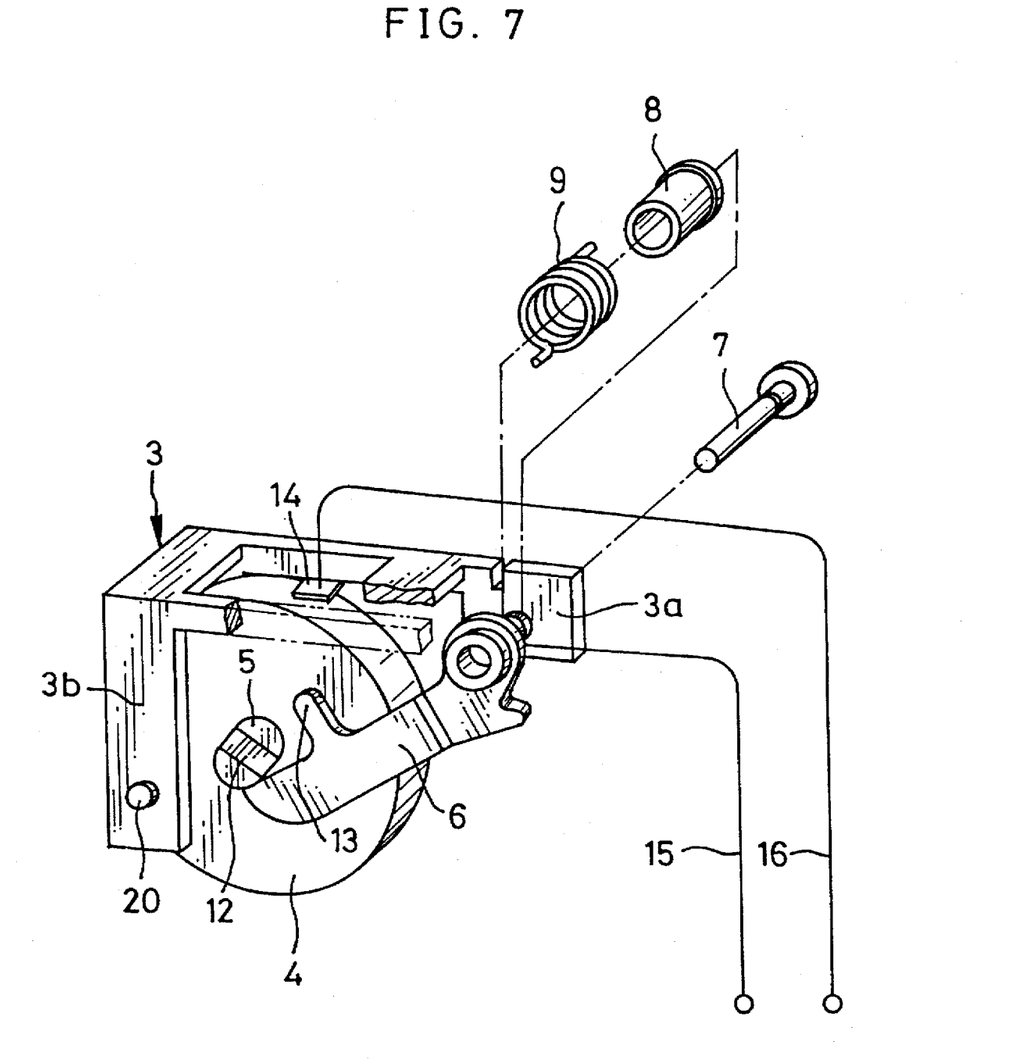
FIG. 7 is a perspective view illustrating an impact sensing mechanism according to the second embodiment.

As illustrated in FIGS. 6 and 7, the weight 4 is freely rotatably supported by a pin 20 on the flange portion 3b of frame 3 at a position offset from the center of gravity of the weight. The cam portion 12 is formed on one side of the weight 4 at the center of gravity of the weight. Other components are similar to those of the first embodiment.

The operation of this modification will now be described.

Figure 8:
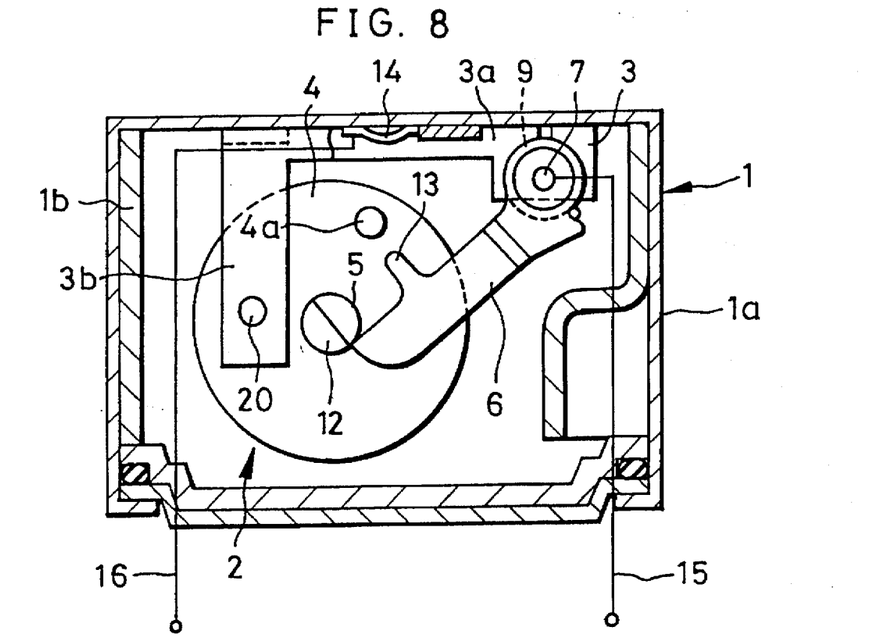
FIG. 8 is a view corresponding to FIG. 6 and illustrating the operation of the modification.
Figure 9:
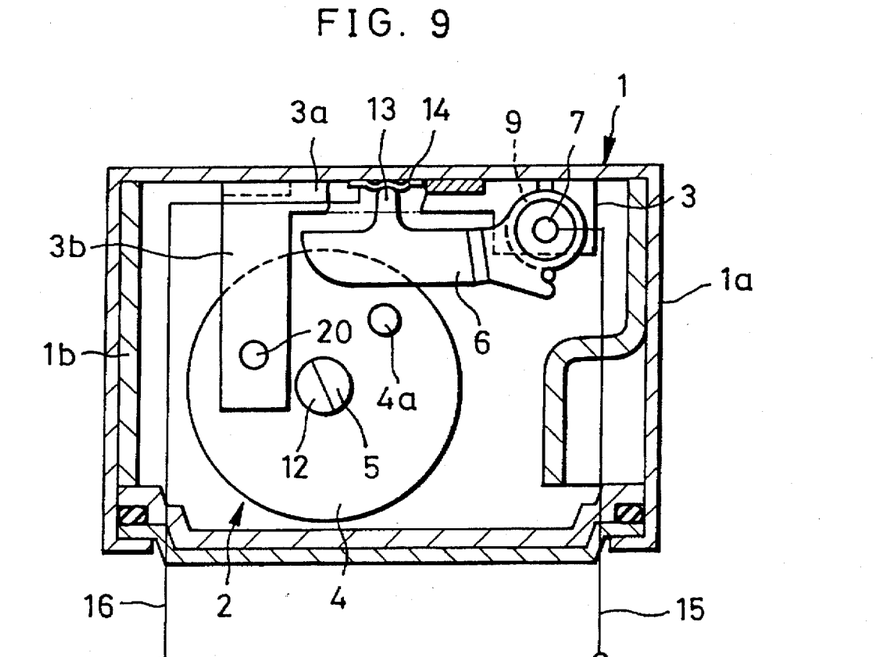
FIG. 9 is a view corresponding to FIG. 6 and illustrating the operation of the modification.

When an impact is applied in the direction of arrow A the initial state shown in FIG. 6, the weight swings about the pin 20 against the biasing force of the torsion spring 9, as illustrated in FIG. 8. As a result, the cam portion 12 and the output lever 6 disengage, as shown in FIG. 9, and the output lever 6 is acted upon by the biasing force of the torsion spring 9 and therefore is turned. Operation from this point is the same as in the first embodiment, and the effects are the same as well. Thus, with this modification, the cam portion 12 is capable of rotating and sliding owing to the rocking motion of the weight 4. This means that the pinion gear 10 and rack gear 11 of the first embodiment are no longer necessary, thus making it possible to reduce the number of component parts as well as the labor involved in machining and assembly.

A third embodiment of the present invention will now be described. Members having the same functions as those in the first embodiment and its modification (second embodiment) are designated by like reference numerals.

Figure 10:
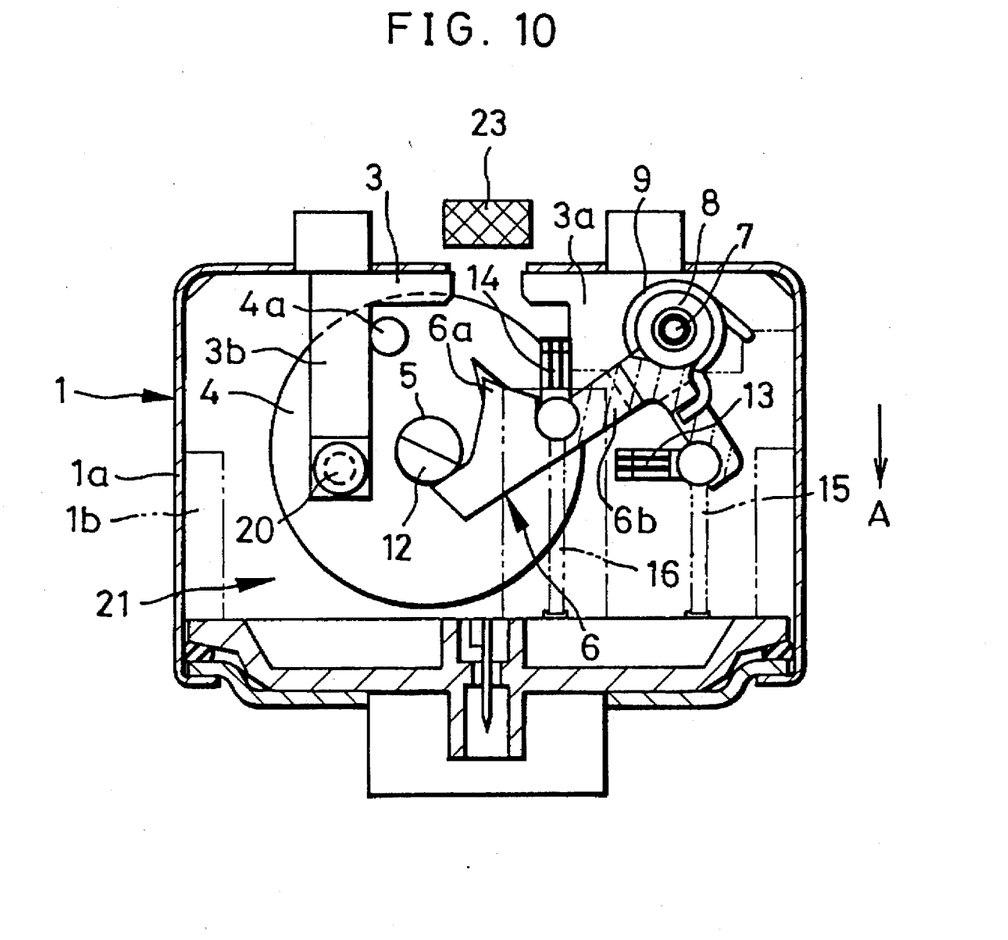
FIG. 10 is a plan view illustrating a third embodiment of an impact sensor according to the present invention.

As shown in FIG. 10, an impact sensor according to a second embodiment of the invention includes the housing 1 in the shape of a box constructed by a combination of a case 1a and an inside housing 1b. An impact sensing mechanism 21 is disposed in the interior space of the housing 1.

The image sensing mechanism 21 will now be described in detail.

Figure 11:
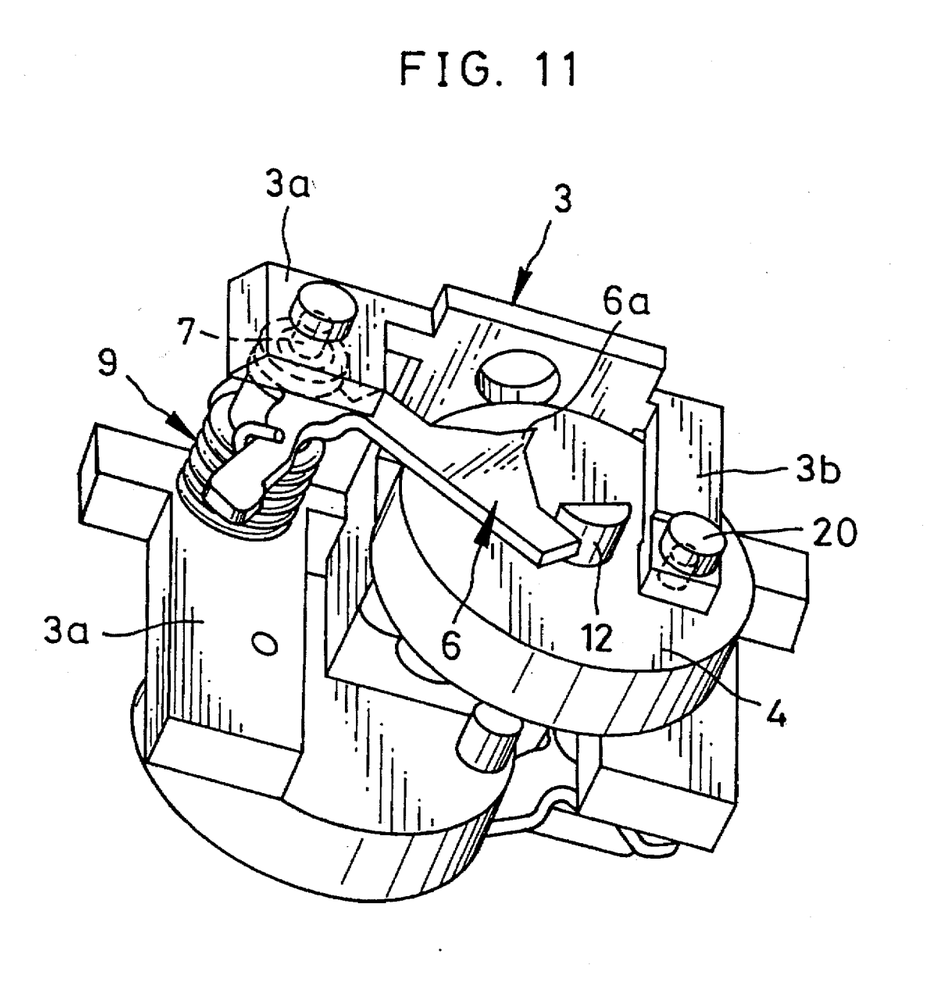
FIG. 11 is a perspective view illustrating an impact sensing mechanism according to the third embodiment.
Figure 12:
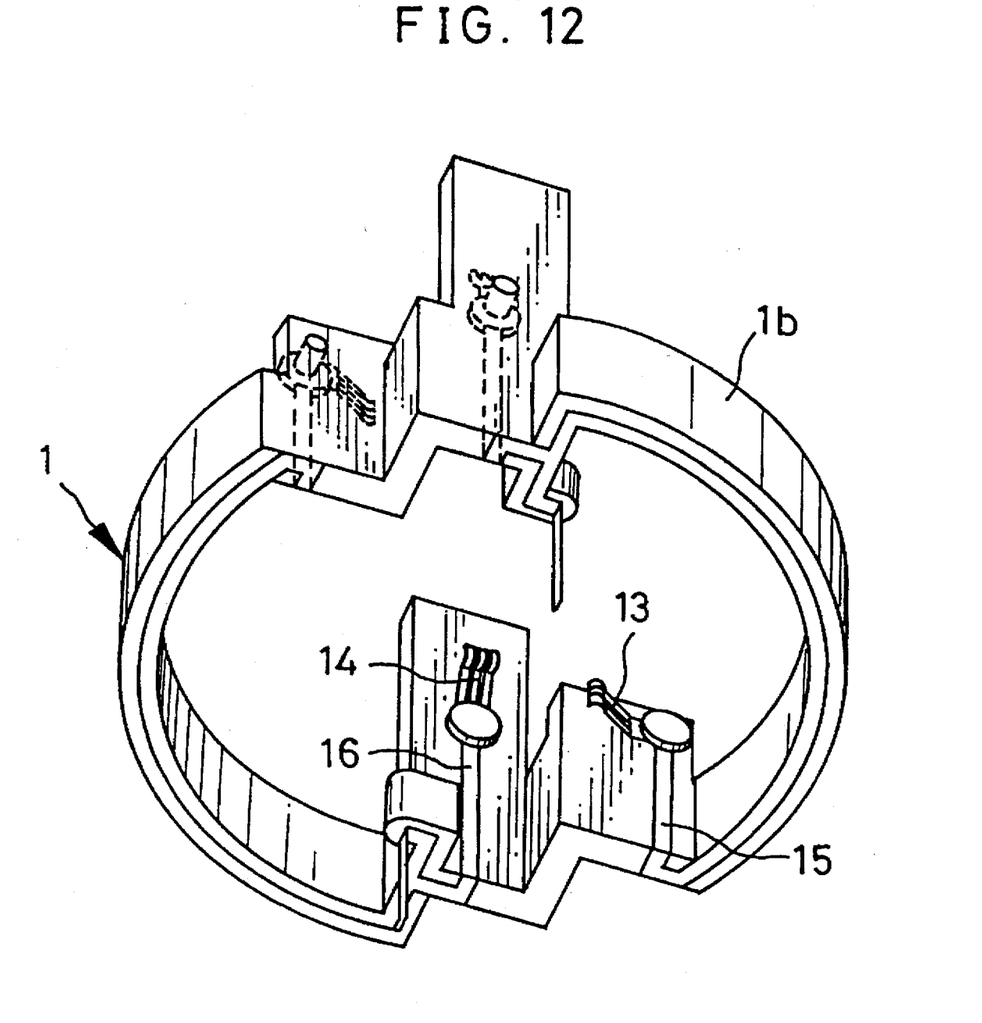
FIG. 12 is a perspective view showing a part of a housing according to the third embodiment.

As illustrated in FIGS. 10 through 12, the impact sensing mechanism 21 includes the frame 3 secured to the housing 1. The frame 3 is composed of the pair of opposing support portions 3a and the flange portion 3b perpendicular to the support portions 3a. The impact-sensing weight 4, rotated by input of an impact, is freely rotatably supported by the pin 20 on the flange portion 3b of the frame 3 at a position offset from the center of gravity of the weight. The weight 4 has a comparatively large diameter and has its center of gravity at is geometric center. Accordingly, as in the second embodiment, a large moment of inertia can be produced when the weight 4 moves about the pin 20 and erroneous operation can be prevented more reliably as by not sensing instantaneous shocks when the vehicle equipped with the impact sensor travels on a bad road. The output lever 6 is pivotally supported between the support portions 3a of the frame 3 via the pin 7. The torsion spring 9 is wound around the pin 7. One end of the torsion spring 9 is fastened to the pin 7 via the collar 8, and the other end of the torsion spring 9 is fastened to the output lever 6. The output lever 6 is thus biased at all times in the clockwise direction in FIG. 1a by the biasing force of the torsion spring 9. Further, the semicircular cam portion 12 is formed at the center of gravity of the weight 4 and is capable of engaging with and disengaging from the output lever 6. Since the output lever 6 and weight 4 are thus supported on the frame 3, these can be made a unit separate from the housing 1 to greatly improve ease of installation. Furthermore, the members 4 and 6 do not readily experience installation error relative to one another, thereby assuring stable operation of the device as an impact sensor.

Figure 13:
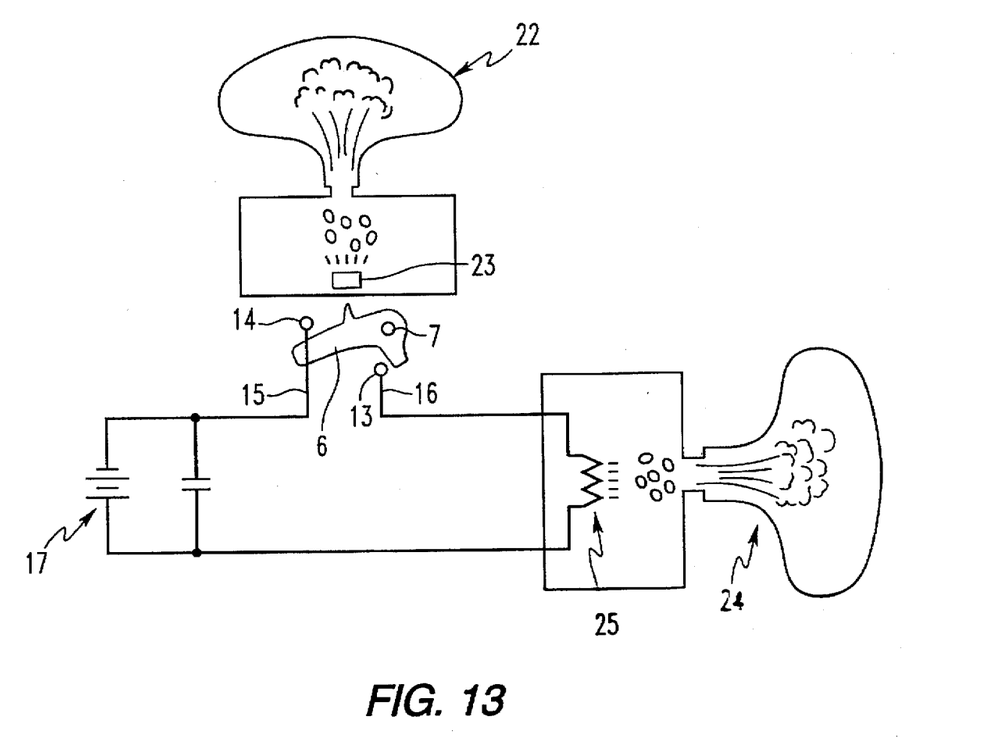
FIG. 13 is a circuit diagram showing an impact safety system employing the impact sensor of the third embodiment.

The output lever 6 is formed to have an output pin 6a and a conductive portion 6b. The conductive portion 6b is in the form of two projections extending at approximately right angles to each other. The output pin 6a strikes against a detonator 23, which actuates an air-bag mechanism 22 for the driver's seat, as illustrated in FIG. 13, the mechanism 22 being disposed adjacent the impact sensing mechanism 21. The first contact point 13 and the second contact point 14 are fixed at locations on the inside housing 1b of the housing 1 where the conductive portion 6b of the output lever 6 will be situated when the output pin 6a strikes the detonator 23. As depicted in FIG. 13, the first contact point 13 and the second contact point 14 are connected between the power supply 17 and an igniting device 25, which actuates a passenger-seat air-bag mechanism 24, via the lead wires 15, 16. Thus, the contact points 13, 14 act as a switch for actuating the air-bag mechanism 24.

The operation of the third embodiment will now be described.

Figure 14:
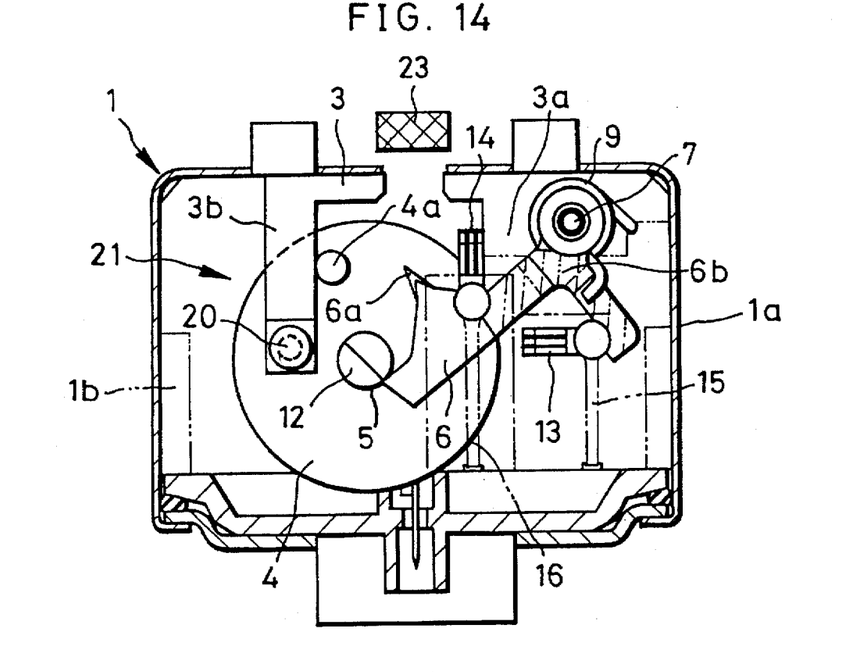
FIG. 14 is a view corresponding to FIG. 6 and illustrating the operation of the third embodiment.
Figure 15:
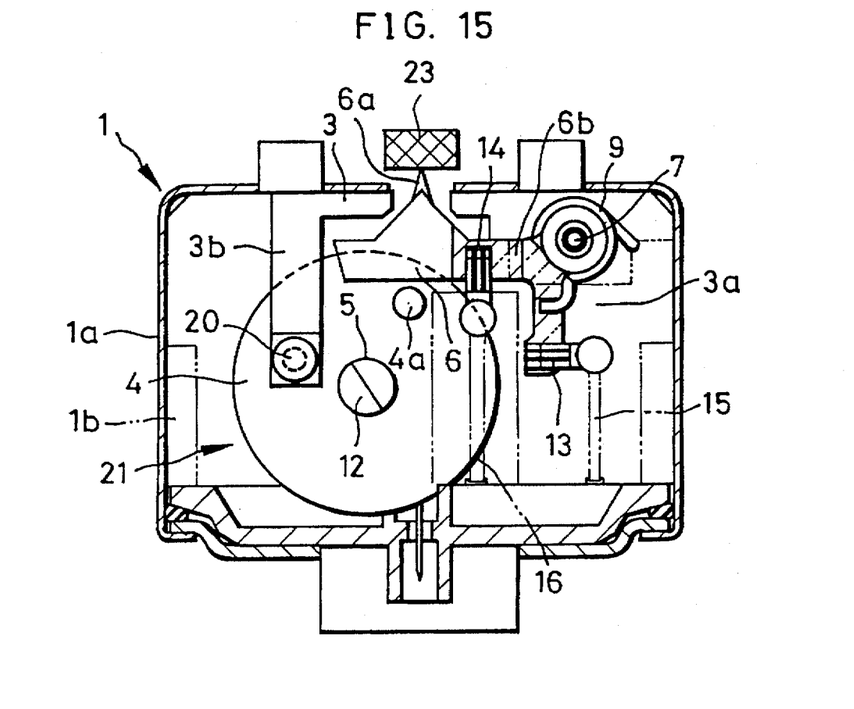
FIG. 15 is a view corresponding to FIG. 6 and illustrating the operation of the third embodiment.

FIG. 10 illustrates the apparatus in the initial state, in which the cam 12 and the output lever 6 are engaged. The weight 4 is maintained in an initial state owing to the biasing force of the torsion spring 9 and the stopper 4a, and the output lever 6 is held against the biasing force of the torsion spring 9 owing to the engagement between the output lever 6 and the cam 12. When an impact is applied in the direction of arrow A under these conditions, the weight 4 swings about the pin 20 against the biasing force of the torsion spring 9, as illustrated in FIG. 14. As a result, the cam portion 12 and the output lever 6 disengage, as shown in FIG. 15, and the output lever 6 is acted upon by the biasing force of the torsion spring 9, and therefore is turned so that the output pin 6a is thrust exterior of the housing 1 and strikes the detonator 23. At the same time, the conductive portion 6b of output lever 6 comes into contact with the first contact point 13 and the second contact point 14 so that these are electrically connected to each other via the conductive position 6b. As a result, the detonator 23 in FIG. 13 is fired to actuate the air-bag mechanism 22 for the driver's seat, and also the power supply 17 and igniting device 25 are electrically connected to drive the firing device 25 and actuate the air-bag mechanism for the passenger's seat.

Thus, as described above, the air-bag mechanism 22 for the driver's seat and the air-bag mechanism for the passenger's seat are respectively actuated by the impact between the output pin 6a of output lever 6 and the detonator 23 in response to operation of the impact sensing mechanism 21; and the electrical connection between the first contact 13 and the second contact 14 via the conductive portion 6b of the output lever 6, also in response to operation of the impact sensing mechanism 21. In other words, the two air-bag mechanisms 22, 24 installed at locations remote from each other can be actuated by the single impact sensing mechanism 21, the latter having a very simple construction obtained merely by adding the first and second contact points 13 and 14 to the conventional impact sensing mechanism.

As many apparently widely different embodiments of the present invention can be made without departing from the spirit and scope thereof, it is to be understood that the invention is not limited to the specific embodiments thereof except as defined in the appended claims.

What is claimed is:

1. An impact sensor comprising:
   a housing having an inner space and a wall for receiving an impact applied in a first direction;
   a unitary assembly constructed independent of the housing and positioned within the housing for being secured to the housing, said unitary assembly including a frame having a first portion which extends along the wall of the housing and a second portion which extends transverse to the first portion;
   a weight pivotally mounted on the second portion of the frame to rotate about a pivot axis when an impact is applied to the housing;
   a cam provided on the weight;
   an electrically conductive output lever pivotally mounted on the first portion of the frame for moving rotatably between one position in which a portion of the output lever engages the cam and another position in which a portion of the output lever extends outside the housing through the first portion of the frame in opposition to the first direction, the output lever having a first contact portion;
   a spring urging the output lever against the cam; and a contact plate mounted to the housing, a portion of the contact plate being spaced from the output lever to form a second contact portion for contact by said first contact portion, said second contact portion being located to be positioned on a path of movement of the first contact portion of said output lever, both the second contact portion and the output lever being continually connected to respective terminals of an electric current source;
   said first and second portions being electrically connected via said output lever by coming into contact with a projection of the output lever, to close an electrical circuit to actuate an impact safety system electrically connected to said first and second contact portions, the spring maintaining electrical contact between the first and second contact portions upon movement of the weight by an external impact.

2. The impact sensor according to claim 1, wherein said spring is stretched between said housing and said output lever.

3. The impact sensor according to claim 1, further comprising moving means disposed between said housing and said weight to produce rotational sliding movement of said weight upon external impact.

4. The impact sensor according to claim 1, wherein said weight is supported by a shaft serving as a fulcrum offset from a center of gravity of said weight to produce a swinging motion of the weight upon the externally applied impact.

5. The impact sensor according to claim 4, wherein said housing includes a frame support within the housing; said shaft being supported by the frame.

6. The impact sensor of claim 1 wherein the portion of the contact plate spaced from the housing is deformable upon movement of the output lever to its operated position.

7. An impact sensor comprising:
   a housing having an inner space and a wall for receiving an impact applied in a first direction;
   a unitary assembly constructed independent of the housing and positioned within the housing for being secured to the housing, said unitary assembly including a frame having a first portion which extends along the wall of the housing and a second portion which extends transverse to the first portion;
   a weight pivotally mounted on the second portion of the frame to rotate about a pivot axis when an impact is applied to the housing;
   a cam provided on the weight;
   an electrically conductive output lever pivotally mounted on the first portion of the frame for moving rotatably between one position in which a portion of the output lever engages the cam and another position in which a portion of the output lever extends outside the housing through the first portion of the frame in opposition to the first direction;
   a spring urging the output lever against the cam;
   a first contact point and a second contact point provided on said housing positioned in spaced relation along the path of movement between the engaged position and the operated position of the said output lever, said first contact point and the second contact point being continually connected to a respective terminal of an electric current source;
   said first and second contact points being electrically connected via the output lever by coming into contact with said output lever during movement of said output lever to the operated position, to actuate a first impact safety system connected to said first and second contact points; and
   an output pin mounted to the output lever to activate a second impact safety system substantially simultaneously with the first impact safety system in response to the movement of the output lever to the operated position.

8. The impact sensor according to claim 7, wherein movement of said weight is a swinging motion about a fulcrum obtained by supporting said weight on the frame at a position offset from a center of gravity of said weight.

9. The impact sensor of claim 7 wherein, the first contact point is a projection that extends substantially perpendicular from the output lever intermediate the ends thereof.

10. The impact sensor of claim 7 wherein the first and second contact points are flexible members slidably engaged by the output lever.

11. The impact sensor of claim 7 wherein the first and second contact points are provided on a portion of the housing perpendicular to a plane of movement of the output lever, and the pair of spaced contact portions of the output lever are formed on a side surface thereof along the plane of movement of the output lever.

12. An impact sensor comprising:
   a housing having an inner space and a wall for receiving an impact applied in a first direction;
   a unitary assembly constructed independent of the housing and positioned within the housing for being secured to the housing, said unitary assembly including a frame having a first portion which extends along the wall of the housing and a second portion which extends transverse to the first portion;
   a weight pivotally mounted on the second portion of the frame to rotate about a pivot axis when an impact is applied to the housing;

a cam provided on the weight;

an electrically conductive output lever pivotally mounted on the first portion of the frame for moving rotatably through an angle less than ninety degrees between one position in which a portion of the output lever engages the cam and another position in which another portion of the output lever extends outside the housing through the first portion of the frame in opposition to the first direction;

a spring urging the output lever against the cam;

a first contact surface and a second contact surface located on said housing in spaced relation to be electrically engaged by a respective one of a pair of spaced contact portions of the output lever during movement of said output lever to the operated position in response to an external impact, both the first and second contact surfaces being continually connected to a respective terminal of an electric current source;

said first and second contact surfaces and said pair of spaced contact portions being electrically connected via said output lever by sliding contact with said pair of spaced contact portions of the lever to close an electrical circuit actuating a first impact safety system connected, to said first and second contact surfaces, and to simultaneously actuate a second impact safety system in response to the striking of a detonator by a projection on the lever, the spring maintaining constant electrical contact between the pair of spaced contact portions and the first and second contact surfaces with the output lever in an operated position.

13. The impact sensor of claim 12 wherein the output lever has two projections extending in different direction, said projections each having one of the pair of contact portions.

14. The impact sensor of claim 13 wherein the pointed projection extends from one of the two projections in a direction different from said one projection.

15. The impact sensor of claim 12 wherein the first and second contact surfaces are provided on a portion of the housing perpendicular to a plane of movement of the output lever, and the pair of spaced contact portions of the output lever are formed on a side surface thereof along the plane of movement of the output lever.

* * * * *